United States Patent [19]

Anderson

[11] 4,200,157
[45] Apr. 29, 1980

[54] SPRING CUSHIONED SHANK FOR EARTHWORKING CHISEL HAVING TRIP MECHANISM WITH AUTOMATIC RESET

[75] Inventor: Carl M. Anderson, Claremore, Okla.

[73] Assignee: Hesston Corporation, Hesston, Kans.

[21] Appl. No.: 903,509

[22] Filed: May 8, 1978

[51] Int. Cl.² .................. A01B 61/04; A01B 35/24
[52] U.S. Cl. .................................. 172/264; 172/705
[58] Field of Search ............... 172/705, 707, 708, 710, 172/261, 262, 263, 264, 265, 266, 269

[56] References Cited

U.S. PATENT DOCUMENTS

| 3,052,308 | 9/1962 | Quanbeck | 172/264 |
| 3,098,531 | 7/1963 | Hunter | 172/710 |
| 3,125,167 | 3/1964 | Mannheim | 172/269 |
| 3,191,688 | 6/1965 | Morkoski | 172/269 |
| 3,223,175 | 12/1965 | Twidale | 172/264 |
| 3,245,480 | 4/1966 | Quanbeck | 172/705 |
| 3,277,967 | 10/1966 | Weispfenning | 172/705 |
| 3,292,713 | 12/1966 | Mannheim | 172/269 |
| 3,326,300 | 6/1967 | Morkoski | 172/264 |
| 3,439,748 | 4/1969 | Ward | 172/269 |
| 3,589,448 | 6/1971 | Gay | 172/264 |

FOREIGN PATENT DOCUMENTS

| 314 | 1/1926 | Australia | 172/705 |
| 426613 | 1/1975 | U.S.S.R. | 172/705 |

Primary Examiner—Richard J. Johnson
Attorney, Agent, or Firm—Schmidt, Johnson, Hovey & Williams

[57] ABSTRACT

A shank assembly for tools, such as those used in tillage on farm implements, is provided with mechanism which, during use, will yield horizontally, yet not trip, when the tool encounters certain abnormal resistances, e.g. frozen or compact soils, thereby maintaining the tool in its proper attitude, which will trip in response to the tool encountering relatively immovable obstructions, for example large, heavy rocks, and which will automatically reset after the tool has cleared the obstruction.

5 Claims, 12 Drawing Figures

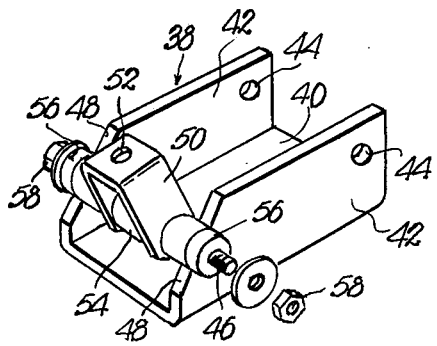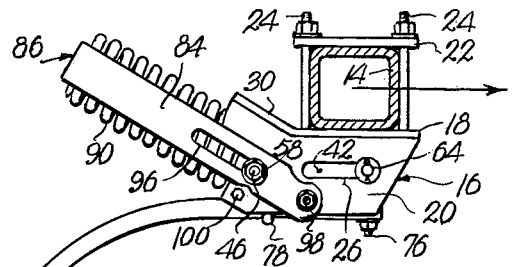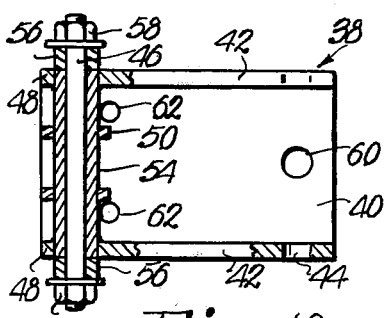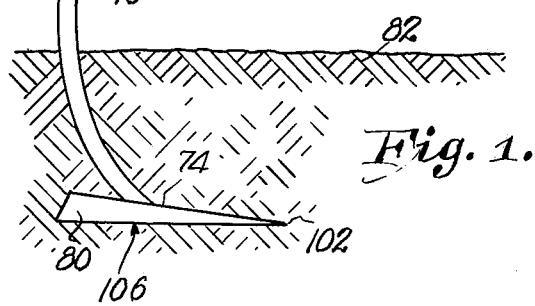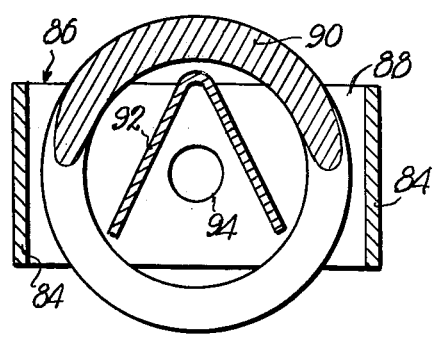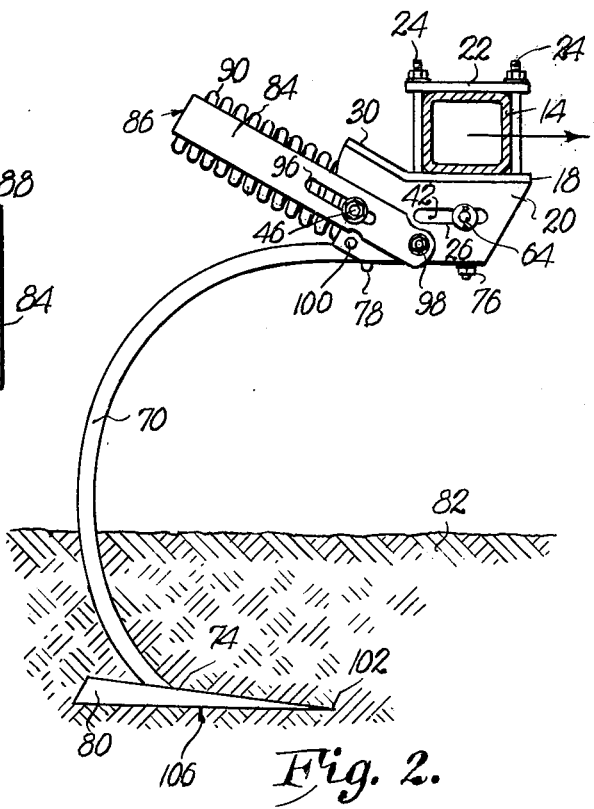

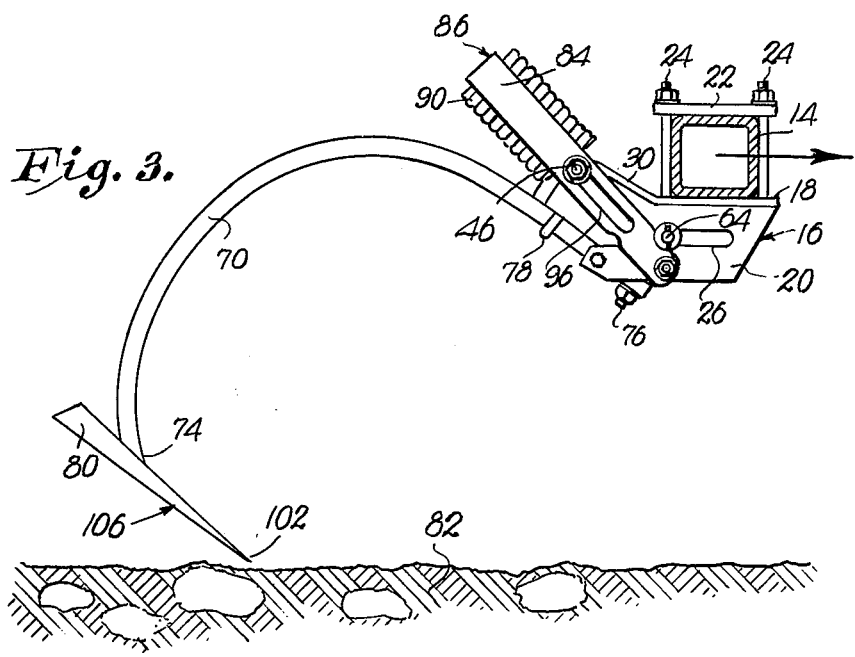
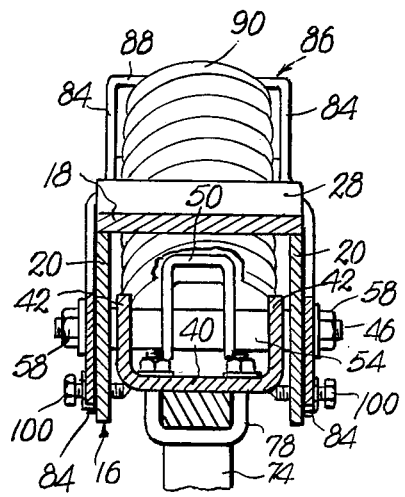
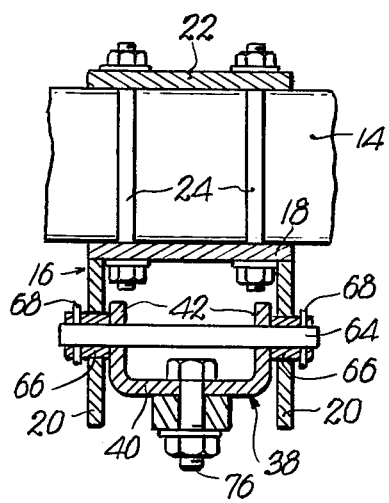
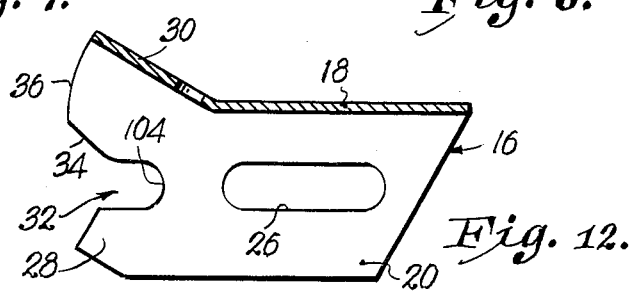

SPRING CUSHIONED SHANK FOR EARTHWORKING CHISEL HAVING TRIP MECHANISM WITH AUTOMATIC RESET

Breakage and other damage to ground-engaging tools for farm implements, to the shanks upon which the tools are mounted and to other mechanism associated therewith continue to be a problem notwithstanding prior attempts to provide satisfactory solutions.

Yieldability to resistances has been suggested but to simply permit the shank to swing back and up is not satisfactory because the tool, such as a shovel, simply tilts, thereby increasing the drag rather than remain in its proper horizontal position in the soil. This should not be permitted when the obstruction causes but little resistance for short duration.

Suggestions for automatic resetting have been successful, for the most part, only with heavy assemblies such as plows and plow beams, as distinguished from lightweight chisels and shanks. Collection of dirt and rust usually requires stopping and backing up in order to reset the trip assembly.

The prior art is exemplified by the following U.S. Letters Patent:

U.S. Pat. No. 3,191,688; Morkoski; June 29, 1965
U.S. Pat. No. 3,292,713; Mannheim; Dec. 20, 1966
U.S. Pat. No. 3,326,300; Morkoski; June 20, 1967
U.S. Pat. No. 3,351,138; Bushmeyer; Nov. 7, 1967
U.S. Pat. No. 3,439,748; Ward; Apr. 22, 1969
U.S. Pat. No. 3,589,448; Gay; June 29, 1971
U.S. Pat. No. 554,892; McFall; Feb. 18, 1896
U.S. Pat. No. 3,052,308; Quanbeck; Sept. 4, 1962
U.S. Pat. No. 3,125,167; Mannheim et al.; March 17, 1964
U.S. Pat. No. 3,245,480; Quanbeck; April 12, 1966
U.S. Pat. No. 3,277,967; Weispfenning; Oct. 11, 1966
U.S. Pat. No. 3,528,505; Bushmeyer et al.; Sept. 15, 1970
U.S. Pat. No. 3,642,074; Geurts; Feb. 15, 1972

It is the object of my present invention, therefore, as distinguished from the above identified patents, to provide in a single assembly all three of the aforesaid functions, namely, yieldability without change in attitude of the tool under certain abnormal resistances, full tripping only when the obstruction is substantially severe, and fail-proof resetting after the tool clears the cause for the tripping.

In the drawings:

FIG. 1 is a side-elevational view of a spring cushioned shank for earthworking chisel having trip mechanism with automatic reset made in accordance with my present invention illustrating the shank attached to a tool bar and in its normal operating position;

FIG. 2 is a view similar to FIG. 1 illustrating the position of the shank when it encounters certain abnormal resistances incapable of causing the shank to trip;

FIG. 3 is a view similar to FIGS. 1 and 2 illustrating the tripped position of the shank;

FIG. 7 is a cross-sectional view taken along line 7—7 of FIG. 4;

FIG. 8 is a fragmentary cross-sectional view taken along line 8—8 of FIG. 4;

FIG. 9 is a perspective view of the shank-supporting carriage;

FIG. 10 is a top-plan view of the carriage shown in FIG. 9 parts being broken away and in section for clearness;

FIG. 11 is an enlarged cross-sectional view taken along line 11—11 of FIG. 6; and FIG. 12 is a vertical cross-sectional view through the support for the carriage.

Figure 4:
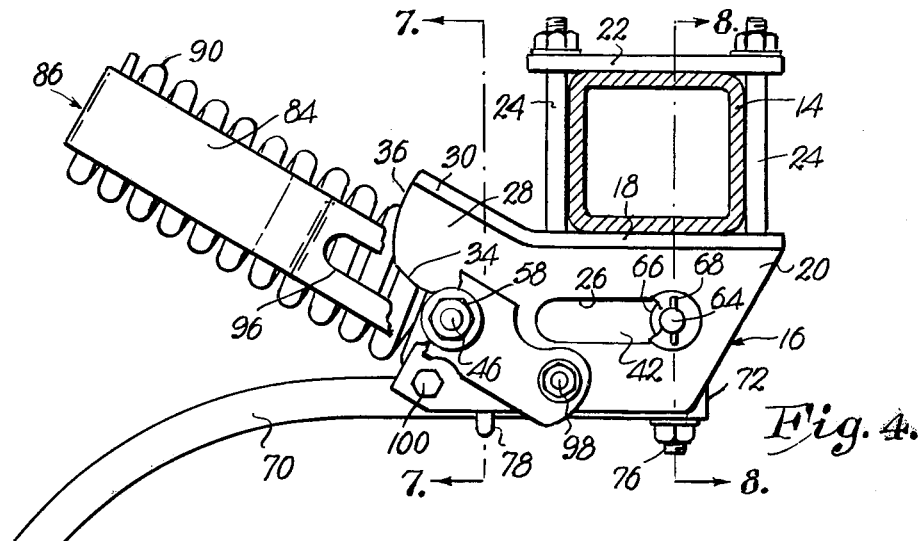
FIG. 4 is an enlarged fragmentary view similar to FIG. 1, parts being broken away for clearness.

Chisel plows are becoming more prevalent in recent years as a primary tillage tool in farming. They are rapidly replacing conventional moldboard plows as a primary tillage tool. Chisel plows offer better erosion control, better moisture conservation and less energy costs per acre than moldboard plows. However, they have been limited in usage in areas where underground obstructions such as rocks, roots or stumps are found because they offer less sophisticated means to overcome these obstacles than do moldboard plows. Consequently, an important aim of my present invention is to provide a spring trip-automatic reset chisel plow shank which will advance the performance of chisel plows to a level equal to moldboard plows in areas where obstructions are numerous.

Chisel plow shanks are currently available in three different types. These shanks are either rigid, spring cushion or spring trip. All three are widely used on current chisel plows and each have desirable features for certain application.

Rigid shanks are suited for areas with no obstructions. The advantages of these shanks are cost, weight and stiffness. However, these shanks are not suited for rocky or stumpy areas.

Spring cushion shanks have spring relief which normally lets the shank deflect back to clear an obstacle 6"–8" high. These shanks deflect in direct proportion to the force applied to the working point of the tool. The springs usually are preloaded such that the shank begins to deflect at a 250–400 pound load on the working point and at full shank deflection the working point exerts a force of 1500–2300 pounds on any obstacle encountered.

The geometry of most spring cushion shanks makes them somewhat unstable in field conditions. The low initial deflection force and the high full deflection force cause the shanks to resonate in heavy soil conditions making the whole machine jump as a row of these shanks resonate in unison.

Another disadvantage of the spring cushion shank is also the result of the low initial deflection force. Because the normal draft force in many field conditions is higher than the initial deflection force, the shanks deflect until the cushion springs exert a force to match the draft load. This results in the working point being tilted from its optimum working position. Consequently, the performance of the chisel plow is adversely affected.

Spring trip chisel plow shanks currently marketed consist of a spring loaded toggle joint which breaks loose at a predetermined working point load (usually 600–750 pounds). After the breakaway takes place the point load required to continue tripping the shank over an obstacle drops to 350–400 pounds. The spring trip geometry has two distinct disadvantages.

First, the shank, once tripped, may not have enough point force to reset itself back into the ground. Consequently, in heavy soil conditions, the farmer must stop the machine and raise it out of the ground to reset the shank.

Second, the geometry of the toggle joint requires extreme precision in manufacture and adjustment to allow the shank to work satisfactorily. The farmer must adjust each shank to accommodate manufacturing tolerances. Also, constant readjustment may be necessary to accommodate for normal wear of the mechanism.

Figure 6:
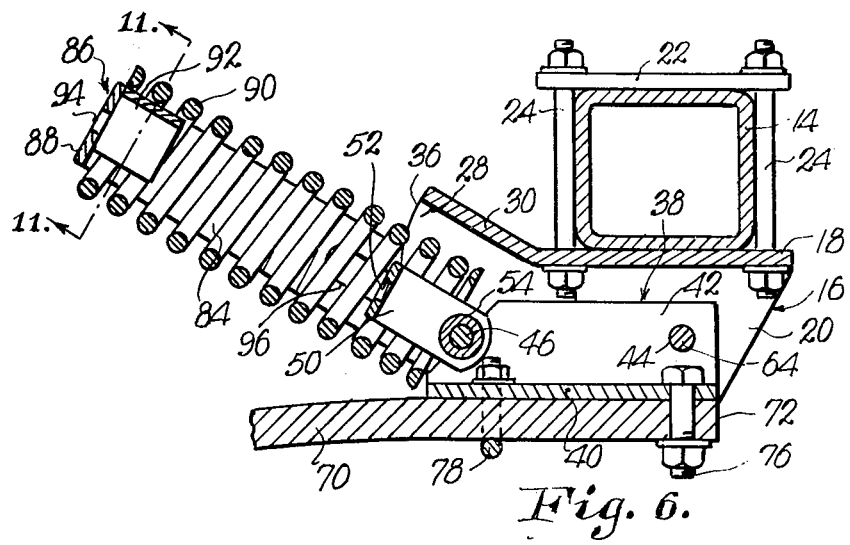
FIG. 6 is a fragmentary cross-sectional view taken on lines 6—6 of FIG. 5.

The farm implement with which the shank assembly of my present invention is adapted to be used has an elongated, horizontal, tubular tool bar 14 transverse to the path of the implement along which a row of such assemblies may be disposed in horizontally spaced relationship. Each such assembly includes a U-shaped support 16 (FIGS. 8 and 12) provided with a horizontal bight 18 having a pair of horizontally spaced, downturned legs 20. The bight 18 is releasably clamped tightly to the bar 14 beneath the latter by a top anchor 22 and a number of draw bolts 24 (FIGS. 6 and 8).

Each leg 20 has a fore and aft slot 26 and a rear section 28 integral with an upwardly and rearwardly inclined portions 30 of the bight 18. A rearwardly opening notch 32 in each section 28 respectively is aligned with the corresponding slot 26. Each section 28 is also provided with a rearwardly facing cam edge having a stretch 34 extending upwardly and rearwardly from its notch 32 and an arcuate stretch 36 between the stretch 34 and the portion 30.

Figure 5:
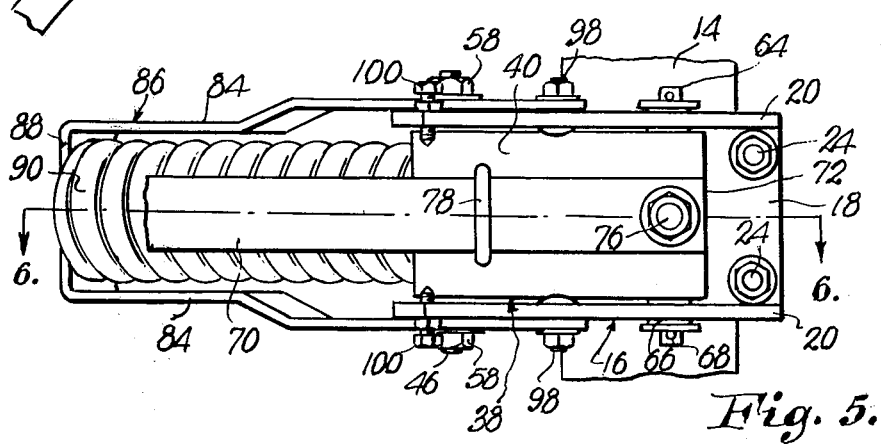
FIG. 5 is a fragmentary view showing the bottom of the shank assembly.

A U-shaped, shank supporting carriage 38 (FIGS. 6–9 and 10) is disposed between the legs 20 for up and down swinging movement and for reciprocable movement fore and aft of the path of travel of the implement. The carriage 38 is provided with a normally horizontal plate 40 spaced from the bight 18 therebeneath and having a pair of horizontally spaced, upstanding flanges 42 each provided with a hole 44 adjacent its forwardmost end. A cross element 46 receives a spacer 54 and a pair of rollers 56. The spacer 54 fixed to inclined rear edges 48 of the flanges 42, receives a swingable, U-shaped spring retainer 50 having a tapped opening 52 in its bight. Rollers 56 exteriorly of a pair of arms 84 (FIG. 5) are held in place by nuts 58 on the element 46. A single hole 60 is provided in the plate 40 at its forward end and two spaced holes 62 are provided in the plate 40 at its near end 48.

A pivot member 64 passing through the holes 44 has rollers 66 (FIGS. 4, 5 and 8) within slots 26 held in place by cross pins 68. An arcuate shank 70 has a forward upper end 72 and a rear lower end 74, and bears flatly against the lower face of the plate 40 adjacent the end 72 (FIG. 6). A bolt 76 through the hole 60 and the shank 70, together with a clamp 78 through the holes 62 and embracing the shank 70 releasably and rigidly join the latter with the carriage 38. A ground-engaging tillage tool 80, which penetrates the soil 82 as shown in FIGS. 1 and 2, is releasably attached to the shank 70 at its end 74. FIGS. 1 and 2 also show the disposition of the tool 80 with at least the major portions thereof rearwardly of a vertical plane through the pair of arms 84 of a yoke 86 (FIGS. 1, 2, 4–6, 11) and through the element 46 when the latter is at the forward end of its path of reciprocation, seated within the notches 32.

The yoke 86 has an upper abutment 88 for one end of a coil spring 90 which is embraced by the arms 84 and compressed between the abutment 88 and the element 46, i.e. spacers 54 (FIG. 6) in surrounding relation to the retainer 50. The upper end of the spring 90 also surrounds a spring retainer 92 fixed to the inner face of the abutment 88 (FIGS. 6 and 11). An L-shaped threaded rod or bolt (not shown) may be passed through an opening 94 in the abutment 88, through the opening 52 for increasing the tension of the spring 90 to release the bias on the carriage 38, thereby easing assembly and disassembly of the components and simplifying installation of repaired and replacement parts. Each arm 84 has an elongated aperture 96 receiving the element 46, and bolts 98 pivotally mount the arms 84 on the legs 20. Lock bolts 100 (FIGS. 4, 5 and 7) carried by the legs 20 limit the extent of downward swinging of the carriage 38 about the axis of the member 64.

In operation of the chisel plow above described, using a relatively light spring 90, the tension of the latter will be preset, for example, such that there will be a force of approximately 385 pounds at the leading tip 102 of the chisel 80, with the carriage 38 yieldably biased by the spring 90 toward the forward most end of its path of travel and with the rollers 56 of the element 46 fully seated within bight 104 of the notches 32 of the support 16 as shown in FIGS. 1, 4 and 6.

As the chisel 80 encounters certain abnormal resistances (such as frozen or partly frozen soil 82, heavy or solid gumbo, sticky mud, tree roots and small rocks that are relatively easy to displace) the spring 90 will cushion the shock on the chisel 80, the shank 70 and all other parts of the assembly, as well as the framework of the implement, including the tool bar 14.

During such cushioning the tension in the spring 90 will increase such that the force which it exerts on the tip 102 will gradually increase from about 385 pounds to approximately 880 pounds in total absence of any tripping. As seen in FIG. 2, the chisel 80, the shank 70, the carriage 38, the member 64 and the element 46 will assume new positions as a unit with respect to the support 16 while the rollers 56 remain in the notches 32 spaced rearwardly of the bights 104. The member 64 reciprocates rectilinearly in the slots 26, the element 46 reciprocates rectilinearly in the apertures 96 and the yoke 86, with the spring 90, swings up and down about the bolts 98 as the resistances as the tip 102 alternately increase and diminish.

All the while, the attitude of the chisel 80 remains constant with its lower surface 106 (FIGS. 1 and 2) substantially horizontal in the best operating condition. There is no tendency of the chisel 80 to tilt while in the soil 82 toward the position shown in FIG. 3. Hence, the drag does not increase with a resultant tendency to break or bend component parts of the shank assembly and the chisel 80 continues to properly work the soil 82 regardless of adverse soil conditions.

However, in the event the chisel 80 encounters a heavy rock or other obstacle not easily displaced, to such extent as to further increase the tension in spring 90 beyond approximately an 880 pound force at the tip 102, the support 16 will move forwardly relative to the carriage 38 such as to cause the rollers 56 to leave the notches 32 and travel upwardly and rearwardly along cam sections 34 and 36. This trips the shank 70 causing it to assume the position shown in FIG. 3 and causing the tool 80 to clear the obstruction in or on the soil 82 before any damage can occur. The spring 90 continues to exert a strong bias on the rollers 56 to hold them tightly against the cam sections 34 and 36. As soon as the rollers 56 engage the cam sections 34, the force exerted at the tip 102 by the spring 90 drops to about 650 pounds and thereafter increases to about 750 pounds by the time the rollers 56 reach the upper ends of the cam sections 36.

It is to be noted that after tripping, the carriage 38 swings upwardly about the member 64 (disposed adjacent the rear ends of the slots 26), the element 46 swings the yoke 86 and the spring 90 upwardly about the bolts 98 and the element 46 travels to the upper ends of the apertures 96. The portion 30 of the support 16 serves as a stop or bumper for the carriage 38, limiting the extent of upward swinging movement of the shank 70.

After the obstruction has been cleared, the spring 90 operates to swing the tool 80 back into the soil 82 and as the rollers 56 reach the notches 32 the carriage 38 returns to horizontal (FIG. 6) and the rollers 56 are snapped back toward the bights 104 with all parts reassuming the positions shown in FIG. 1.

In the event a heavier spring 90 is used for heavy-duty usage behind large tractors, it could be precompressed, for example, to effect a force of about 675 pounds at tip 102, increasing to about 1250 pounds just prior to tripping, in which event, the forces would change proportionately after tripping, as above explained, such that after tripping the force required to continue tripping remains nearly constant. All of the above advantages are optimum when the relationship of the tip or working point 102 to the element 46 under normal conditions is as illustrated in FIG. 1.

From the foregoing it is now seen that the spring trip-automatic reset shank assembly has been designed to have the features of all three types of shanks currently on the market but without the disadvantages. The mechanism is designed to remain rigid and thus hold the working point 102 at its proper orientation. The spring trip is designed to trip only if the shank 70 strikes an obstacle which endangers the shank 70, working point 102 or frame structure. After tripping, the mechanism maintains a sufficiently high, constant point load and trips only enough to clear or free itself from the obstacle. Once tripped, the mechanism exerts sufficient point force to reset the shank 70 to its locked position. The mechanism, as designed, minimizes the effect of manufacturing tolerances and eliminates field adjustments.

The basic engineering principles of this design involve utilizing the features of the coil spring 90, the cam 34,36 and rollers 56,56 to overcome the resultant force and moment couple imparted at the pivot point 64 of the shank mounting.

The coil spring 90 resists the direct resultant force of the shank draft load but unlike either the spring cushion type or the spring trip type, the moment couple imparted by the shank draft load is resisted by the mechanical lock of the cam. Therefore, the mechanical advantage, the shank point force to spring force ratio is 1:1 instead of 1:3 or 1:4 as is common on spring cushion shanks.

As the mechanism trips, the shank 70 moves horizontally, for example, about 1 inch until the cam configuration allows the shank 70 to begin rotating about the pivot pin 64 and thus to rise upwardly over the obstacle. At this point, the point force exerted by the shank mechanism is maximum. After this point is passed, the cam design controls the spring deflection such that the point force is substantially constant regardless of the amount of shank rotation. The mechanism thus provides sufficient trip force to maintain the shank 70 in its locked position as well as sufficient point force at full or partial shank trip to reset the shank 70 to locked position.

The forces required during the three stages of the trip action are optimized to control the action of the trip. The initial load required to begin the trip action depends on the preload of the coil spring 90. The point force required to trip the shank mechanism out of "locked" position into "tripping" position at the start of the cam incline depends on spring selection. The force required to continue tripping the shank 70 out of the ground 82 over the obstacle has been determined as above set forth. As the shank 70 resets, the forces and action are the reverse of the tripping phase.

What I claim is:

1. In a farm implement, a shank assembly including:
   a tool-supporting shank and a ground-engaging tool attached to said shank;
   means supporting the shank for up and down swinging movement and for reciprocable movement fore and aft of the path of travel of the implement; and
   resilient means yieldably restricting the shank to said reciprocable movement during normal tool operating conditions and certain abnormal resistances encountered by said tool,
   said resilient means being disposed to maintain a yieldable bias against upward swinging movement of the shank resulting from the tool encountering relatively immovable obstructions, whereby to automatically reset the tool after clearing the obstructions,
   there being a releasable locking means for said assembly arranged to permit aft movement of said shank in opposition to the resistance of said resilient means and preclude upward swinging movement of the shank until the assembly is unlocked,
   said assembly including a shank-supporting carriage, said resilient means acting on the carriage to yieldably bias the same toward the forward end of its path of travel,
   said carriage being pivotally mounted for up and down swinging movement, said locking means holding the carriage against upward swinging movement until it moves a predetermined distance rearwardly against the action of said resilient means,
   said means supporting the shank being U-shaped, presenting a bight having a pair of downturned legs, each leg being provided with an elongated slot, the pivotal mounting for the carriage comprising a pivot member passing through the carriage and the slots,
   said carriage being U-shaped, presenting a plate having a pair of upturned flanges between said legs, the plate being movable fore and aft beneath said bight, the pivot member passing through said legs.

2. The invention of claim 1, each leg having a rearwardly opening notch and a rearwardly facing, arcuate, cam edge extending upwardly from the notch, there being a cross element rearwardly of the member, secured to the flanges, normally seated in the notches, and slidable along said edges in response to sufficient rearward movement of the carriage to unseat the element from within the notches.

3. The invention of claim 2, there being a U-shaped yoke provided with an upper abutment having a pair of elongated arms swingably coupled with said legs, each arm having an elongated, longitudinally-extending aperture receiving said element, said resilient means being a coil spring compressed between the abutment and the element.

4. The invention of claim 3; and a tool mounted on the shank, at least the major portions of said tool being disposed rearwardly of a vertical plane through said arms and said element when the latter is seated within the notches.

5. In a farm implement having a tool bar,
- a U-shaped support provided with a horizontal bight having a pair of horizontally spaced, downturned legs;
- means for rigidly securing said bight to said bar beneath the latter,
- each leg having a fore and aft slot, a rearwardly opening notch and a rearwardly facing, arcuate, cam edge extending upwardly from the corresponding notch;
- a U-shaped shank-supporting, carriage disposed between said legs and provided with a normally horizontal plate having a pair of upturned flanges;
- an arcuate shank having a normally upper, forward most end and a normally lower end;
- releasable means rigidly joining the shank to the plate beneath the latter at said upper end;
- a tillage tool;
- means releasably attaching said tool to the shank at said lower end;
- a pivot member extending through the flanges and the slots,
- said member being disposed to support the carriage, the shank and the tool for up and down swinging movement as a unit relative to the support about the member and for rectilinear reciprocation along the slots;
- a U-shaped yoke provided with an upper abutment having a pair of elongated arms extending past said edges in embracing relation to said legs,
- each arm having an elongated, longitudinally extending aperture;
- means pivotally mounting said arms on corresponding legs for up and down swinging movement of the yoke relative to the support;
- a cross element disposed rearwardly of and in parallelism to the member,
- said element being secured to the flanges, reciprocable along the apertures and normally seated in said notches for releasable locking of said carriage, said shank, said tool and said yoke against swinging movement; and
- a coil disposed between said arms for swinging movement with the yoke,
- said spring being compressed between the abutment and the element for yieldably precluding movement of the latter from within the notches as the tool encounters certain abnormal resistances during use of the implement, for maintaining the element in sliding engagement with said edges upon unseating of the element from within the notches in response to the tool encountering relatively immovable obstructions and for automatically returning the element into seated relationship to the notches after each obstruction is cleared.

* * * * *